(12) United States Patent  (10) Patent No.: US 12,301,990 B2
Sharoukhov et al.  (45) Date of Patent: May 13, 2025

(54) DEEP LEARNING MODEL FOR AUTO-FOCUSING MICROSCOPE SYSTEMS

(71) Applicant: Nanotronics Imaging, Inc., Cuyahoga Falls, OH (US)

(72) Inventors: Denis Sharoukhov, Brooklyn, NY (US); Tonislav Ivanov, Brooklyn, NY (US); Jonathan Lee, New York, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 113 days.

(21) Appl. No.: 17/444,603

(22) Filed: Aug. 6, 2021

(65) Prior Publication Data

US 2022/0046180 A1  Feb. 10, 2022

Related U.S. Application Data

(60) Provisional application No. 63/062,592, filed on Aug. 7, 2020.

(51) Int. Cl.
*H04N 23/67* (2023.01)
*G06T 7/00* (2017.01)

(52) U.S. Cl.
CPC ......... *H04N 23/675* (2023.01); *G06T 7/0012* (2013.01); *G06T 2207/10056* (2013.01)

(58) Field of Classification Search
None
See application file for complete search history.

(56) References Cited

U.S. PATENT DOCUMENTS

| | | | |
|---|---|---|---|
| 5,245,173 A | | 9/1993 | Yamana et al. |
| 5,932,872 A | * | 8/1999 | Price ............... G01N 15/147 250/201.3 |
| 7,576,307 B2 | | 8/2009 | Yazdanfar et al. |
| 10,146,041 B1 | | 12/2018 | Putman et al. |
| 2005/0056767 A1 | | 3/2005 | Kaplan et al. |
| 2008/0266440 A1 | | 10/2008 | Yazdanfar et al. |

(Continued)

FOREIGN PATENT DOCUMENTS

| | | |
|---|---|---|
| CN | 106842534 | 6/2017 |
| DE | 102018219867 A1 | 5/2020 |

(Continued)

OTHER PUBLICATIONS

Wei L, Roberts E. Neural network control of focal position during time-lapse microscopy of cells. Scientific reports. May 9, 2018;8(1):1-0. (Year: 2018).*

(Continued)

*Primary Examiner* — Clifford Hilaire
(74) *Attorney, Agent, or Firm* — DLA PIPER LLP (US)

(57) ABSTRACT

A computing system receives, from an image sensor, at least two images of a specimen positioned on a specimen stage of a microscope system. The computing system provides the at least two images to an autofocus model for detecting at least one distances to a focal plane of the specimen. The computing system identifies, via the autofocus model, the at least one distance to the focal plane of the specimen. Based on the identifying, the computing system automatically adjusts a position of the specimen stage with respect to an objective lens of the microscope system.

20 Claims, 4 Drawing Sheets

(56) References Cited

U.S. PATENT DOCUMENTS

| | | | |
|---|---|---|---|
| 2008/0266652 A1* | 10/2008 | Yazdanfar | G02B 21/245 359/363 |
| 2008/0291532 A1 | 11/2008 | Xu et al. | |
| 2009/0074393 A1 | 3/2009 | Park et al. | |
| 2009/0195688 A1 | 8/2009 | Henderson et al. | |
| 2012/0106937 A1 | 5/2012 | Molin et al. | |
| 2012/0236120 A1* | 9/2012 | Kramer | G02B 21/0004 382/128 |
| 2018/0292638 A1 | 10/2018 | Bredno et al. | |
| 2018/0329194 A1 | 11/2018 | Small et al. | |
| 2019/0339503 A1 | 11/2019 | Putman et al. | |
| 2020/0160065 A1 | 5/2020 | Weinzaepfel | |
| 2021/0011271 A1 | 1/2021 | Putman et al. | |
| 2022/0028116 A1 | 1/2022 | Sieckmann et al. | |
| 2023/0113528 A1 | 4/2023 | Putman et al. | |

FOREIGN PATENT DOCUMENTS

| | | | |
|---|---|---|---|
| JP | H04330411 A | | 11/1992 |
| JP | H0593845 A | | 4/1993 |
| JP | H10502466 A | | 3/1998 |
| JP | 2009069831 A | | 4/2009 |
| JP | 2016527549 A | | 9/2016 |
| JP | 2020-27659 | | 2/2020 |
| KR | 20140045331 | | 4/2014 |
| KR | 20150034757 | | 4/2015 |
| WO | 9601438 | A1 | 1/1996 |
| WO | 02/39059 | | 5/2002 |
| WO | 2019159627 | | 8/2019 |

OTHER PUBLICATIONS

Dastidar TR, Ethirajan R. Whole slide imaging system using deep learning-based automated focusing. Biomedical Optics Express. Jan. 1, 2020;11(1):480-91. (Year: 2020).*

Sun, Y., Zhu, L., Wang, G. and Zhao, F., 2017. MultiaInput Convolutional Neural Network for Flower Grading. Journal of Electrical and Computer Engineering, 2017(1), p. 9240407. (Year: 2017).*

PCT International Application No. PCT/US21/44988, International Search Report and Written Opinion of the International Searching Authority, dated Nov. 9, 2021, 8 pages.

Office Action for Taiwan Patent Application No. 110129282, mailed Apr. 6, 2023, 4 pages.

Office Action for Japanese Patent Application No. 2023507491, mailed Dec. 22, 2023, 11 Pages.

Office Action of JP Patent Application No. 2023-5074991, dated Jul. 5, 2024, 7 pages.

Extended European Search Report for Application No. 21853698.5, dated Aug. 2, 2024, 11 pages.

Shajkofci A., et al., "DeepFocus: A Few-Shot Microscope Slide Auto-Focus Using a Sample Invariant CNN-Based Sharpness Function," 2020 IEEE 17th International Symposium on Biomedical Imaging (ISBI), IEEE, Apr. 3, 2020, pp. 164-168. XP033774070, DOI: 10.1109/ISBI45749.2020.9098331 [retrieved on May 21, 2020].

Wang C., et al., "Intelligent Autofocus," arXiv:2002.12389v1, Feb. 27, 2020, 12 pages.

Office Action for Korean Patent Application No. 10-2023-7000838, mailed Jan. 3, 2025, 8 pages.

* cited by examiner

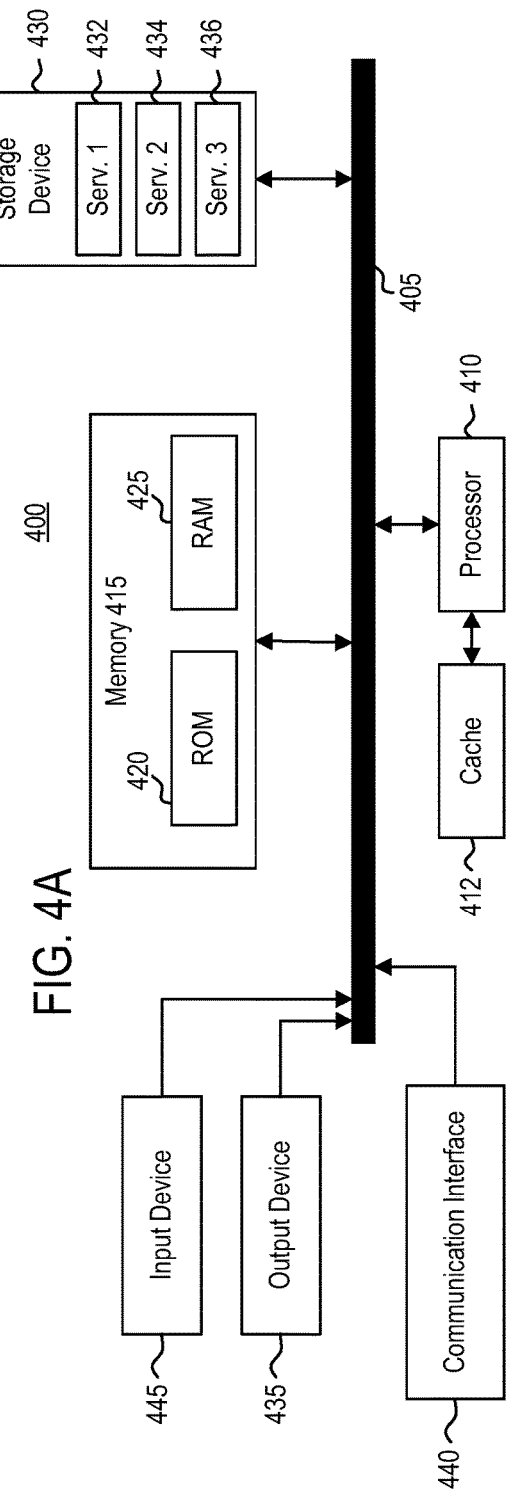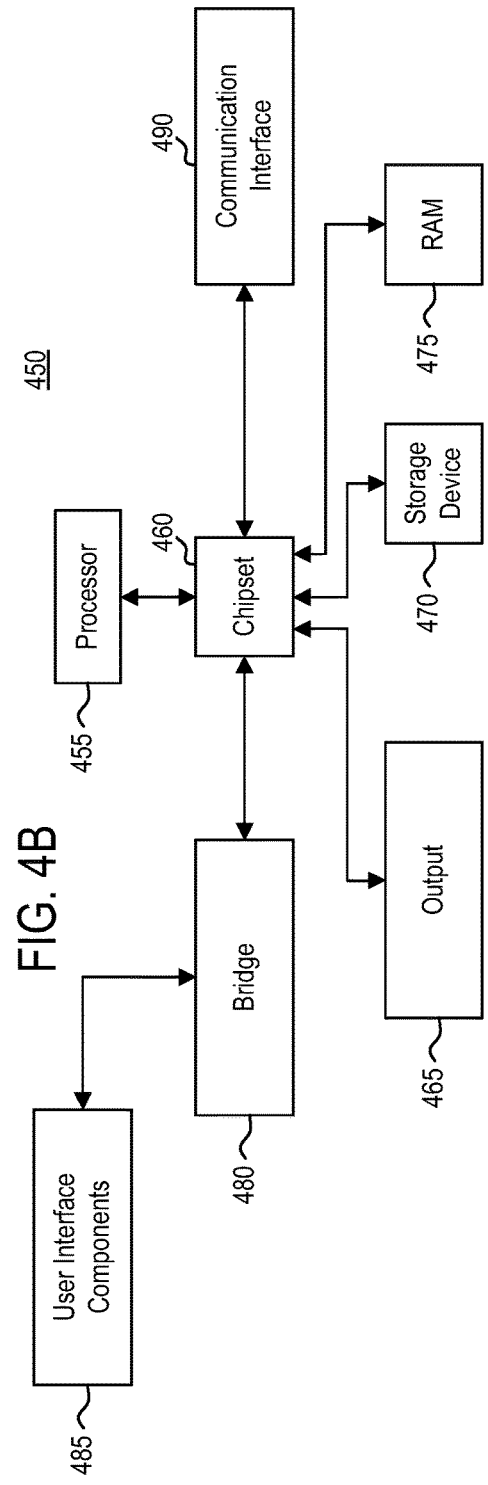

DEEP LEARNING MODEL FOR AUTO-FOCUSING MICROSCOPE SYSTEMS

CROSS-REFERENCE TO RELATED APPLICATIONS

This application claims priority to U.S. Provisional Application Ser. No. 63/062,592, filed Aug. 7, 2020, which is hereby incorporated by reference in its entirety.

BACKGROUND

Finding the focal plane is important to an imaging system. At the correct focal plane, all features of interest are clearly visible and have high contrast. In microscopy, finding this plane is typically done by employing a contrast scoring metric to evaluate how focused an image is, and a Z-axis searching algorithm to direct the system to an image with a higher contrast score. However, this focus procedure can be time-consuming due to collection and evaluation of large number of images across a wide Z-axis range. Furthermore, identifying the best contrast scoring metric for a given sample is a non-trivial task. For example, in the field of specimen inspection, these challenges can impede high-throughput production goals that involve inspection of a high number of specimens that require focusing on multiple locations per specimen. In another example, in the field of inspection of light sensitive biological samples, photobleaching of the samples can occur due to the prolonged exposure to light during traditional focusing on the sample.

SUMMARY

In some embodiments, a microscope system is disclosed herein. The microscope system includes an optical system for imaging a specimen and a focus detection system for automatically focusing the optical system. The optical system includes an objective lens and a specimen stage configured to support the specimen during imaging. The focus detection system includes a computing system that includes a processor and a memory. The memory has programming code stored thereon, which, when executed by the processor, causes the computing system to perform operations. The operations include receiving, by the computing system from the optical system, at least two images of the specimen positioned on the specimen stage. The operations further include providing, by the computing system, the at least two images to an autofocus model for detecting at least one distance to a focal plane of the specimen. The operations further include identifying, via the autofocus model, the at least one distance to the focal plane of the specimen. The operations further include, based on the identifying, automatically adjusting, by the computing system, a position of the specimen stage with respect to an objective lens of the microscope system.

In some embodiments, a method is disclosed herein. A computing system receives, from an image sensor, at least two images of a specimen positioned on a specimen stage of a microscope system. The computing system provides the at least two images to an autofocus model for detecting at least one distances to a focal plane of the specimen. The computing system identifies, via the autofocus model, the at least one distance to the focal plane of the specimen. Based on the identifying, the computing system automatically adjusts a position of the specimen stage with respect to an objective lens of the microscope system.

In some embodiments, a non-transitory computer readable medium is disclosed herein. The non-transitory computer readable medium includes one or more sequences of instructions, which, when executed by a processor, causes a computing system to perform operations. The operations include receiving, by the computing system from an image sensor, at least two images of a specimen positioned on a specimen stage of a microscope system. The operations further include providing, by the computing system, the at least two images to an autofocus model for detecting at least one distances to a focal plane of the specimen. The operations further include identifying, via the autofocus model, the at least one distance to the focal plane of the specimen. The operations further include, based on the identifying, automatically adjusting, by the computing system, a position of the specimen stage with respect to an objective lens of the microscope system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A illustrates a system bus computing system architecture, according to example embodiments.

FIG. 4B illustrates a computer system having a chipset architecture, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
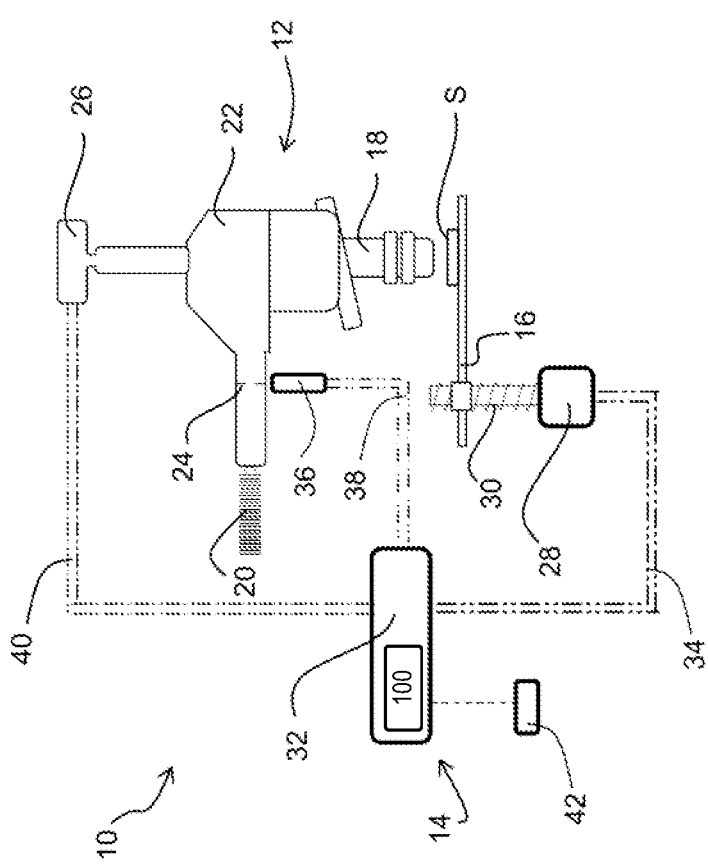
FIG. 1 illustrates an exemplary microscope system, according to example embodiments.

Focusing is an important function of a microscope system, and research on automated focus has been ongoing since the 1970s. Different solutions have been explored that fall into two categories—hardware autofocus, which uses special hardware attached to the microscope to focus the system, and software autofocus, which uses algorithms that are run on the the image data to focus the system.

Commercially available hardware autofocus systems typically utilize a laser or white light in confocal displacement configuration to determine the in-focus position. While accurate and fast, these systems can be quite expensive, require appropriately reflective samples, and can cause imaging artifacts. Several other hardware-base methods of focusing have been proposed that require less-expensive hardware to perform focus, uses data acquired using a phase sensor, and then applies deep reinforcement learning to predict the distance to focus, computes the Fourier transform of a defocused image taken under coherent LED illumination, and then uses a Fully Connected Fourier Network to predict focus. While much more economical, both of these approaches require installing additional hardware, which requires a phase sensor and an LED pattern illuminator. Installing such hardware may be infeasible with some systems. The present system does not have the requirement of extra hardware.

On the other hand, software algorithms perform a search for the optimal focal plane by adjusting the Z-axis in real-time, by acquiring images at various Z-axis positions and performing computations. This computation on the raw image, also known as scoring, calculates a metric that allows quantification of how focused an image is. Typically, a focus score is a contrast metric computed by applying an edge detection kernel, such as a Sobel kernel, to every pixel in the image and summing up the pixel values. In conjunction with the scoring metric, several different search algorithms can then be employed to identify the correct focal plane. A linear or binary search can be employed to find the focal plane within a predefined search window. Alternatively, a parabolic search can be used to eliminate the requirement of a predefined search window. This algorithm assumes the focus score function is a parabola, and then computes the derivatives of the score function to estimate the peak of the focus score parabola. In images with good signal to noise ratio and sufficient amount of edge features, the contrast scoring functions give accurate determination of the focal plane. Nevertheless, performing the search algorithm by moving the microscope chuck and acquiring images can be time consuming.

To overcome the time limitation of conventional focusing algorithms, one or more techniques described herein utilize at least two images taken a short distance apart (e.g., in the z-direction), which predicts in one shot, the offset distance to the focal plane. For example, one or more techniques described herein may use a regression convolutional neural network (CNN) model that is trained on data from different X, Y, and Z-axis locations from a specimen sample. Because this approach predicts the distance to focus in one shot without the need of sweeping the z-axis, it is much faster compared to classical methods. Even with limited input data, the present approach finds the offset to focus distance with a very high level of accuracy. In some embodiments, a contrast metric can be used to verify the predicted location is within the depth of field. In some embodiments, such as that when the focal plane was not reached, the procedure can be iterated or a fine-focus algorithm performed to correct for any error.

In some embodiments, the at least two images may differ only in their Z-axis location. In some embodiments, the at least two images may additionally differ in their X,Y-axis locations. In such an embodiment, the autofocus model may predict the offset distance to the focal plane at some point. This approach may allow movement in the X and Y directions, while waiting for the Z-axis to move, which may allow for faster acquisition of estimated focal positions at many points on a specimen.

In some embodiments, the procedure may be repeated for multiple levels, depending on the specimen being analyzed. In some embodiments, such operations may be applied to specimens with multiple focal planes, thus allowing for a consistent selection of a particular focal plane within the specimen.

In some embodiments, the procedure may be applied to both bright field and dark field imaging. In some embodiments, the procedure may be applied to fluorescent imaging. In some embodiments, the procedure may be applied the UV imaging.

As discussed above, conventional microscopy focusing methods perform a time consuming sweep through the Z-axis in order to estimate the focal plane. One or more techniques described herein improves upon conventional approaches, by providing a system that implements a deep learning model to predict, in one shot, the distance offset to the focal plane from any initial position using an input of at least two images taken a set distance apart. The difference of these two images may processed through a regression CNN model, which may be trained to learn a direct mapping between the amount of defocus aberration and the distance from the focal plane. In some embodiments, a training dataset may be acquired from specimen samples at different surface locations on the sample and at different distances from focus. In some embodiments, the ground truth focal plane may be determined using a parabolic autofocus algorithm with the Tenengrad scoring metric. In some embodiments, the CNN model may be tested on bare and patterned specimen samples. The model is able to determine the in-focus position with high reliability, and is significantly faster than conventional methods that rely on classical computer vision. Furthermore, the present system can detect rare cases where the focal plane was not found, and apply a fine-focus algorithm to correct the result. With the collection of sufficient training data, the present deep learning focusing model provides a significantly faster alternative to conventional focusing methods.

One conventional approach for auto-focusing is use of Deep Reinforcement Learning, which learns an auto-focus policies through several coarse and fine steps to get the system in focus. Unlike this system, the present approach achieves focus in a single step. Other conventional methods use CNN features to produce a probability score which is used to detect out of focus images and/or a combination of CNN and hand-crafted features to produce a focus quality prediction that is used to focus the system. Unlike these methods, the present system is configured to directly predict the distance to focus and not some abstract focus metric.

Another conventional approach described a single-shot autofocus that produces a focused image from a single defocused image. For example, this approach utilized a Generative Adversarial Network (GAN) that learns from a pair of an in-focus and of an out-of-focus image. One key difference with the present model is that it is designed to be used in an online setting and produces a distance to focus. In comparison, this conventional model generates a synthesized offline focused image. Further, another conventional approach to auto-focusing uses a residual CNN to obtain the focus distance from a single defocused image. This approach claims that the asymmetry in the Point Spread Function (PSF) allows for the CNN to identify the offset direction to the focal plane without the need of a second image. Because the present system utilizes at least two images in making the determination, the present system does not need to make similar assumption.

Still further, another conventional approach leverages the difference between two images taken at a fixed distance, which is then fed into a CNN to predict the focus distance. The difference inherently encodes the direction of travel (up or down) in the case of a symmetric PSF. The present system on the other hand uses a custom neural network architecture instead of leveraging an off-the-shelf neural network. The present system also performs experiments on different type of image data which is featureless and much more difficult to focus on.

FIG. 1 illustrates an exemplary microscope system 10, according to example embodiments. Microscope system 10 may include an optical system 12 for imaging a specimen, and a focus detection system 14 for automatic focusing. Microscope system 10 may employ a modified reflected light microscope as the optical system 12, but it should be noted that a transmitted light microscope may be similarly adapted.

Optical system 12 may include a specimen stage 16 carrying a specimen S, under an objective lens 18. Optical system 12 may further include a light source 20 and a vertical illuminator 22 for illuminating the specimen S. Optical system 12 may also include an adjustable F-Stop 24. An image sensor 26 may receive the image transmitted through objective lens 18. In some embodiments, image sensor 26 may be considered a component of focus detection system 14.

Focus detection system 14 may include a motor 28 and drive mechanism 30 that operate to move the specimen stage 16 (and thus the specimen S thereon) toward and away from the objective lens 18. Drive mechanism 30 may be representative of a screw that may be rotated by motor 28 to advance specimen stage 16. For example, specimen stage 16 may be moved in an upward direction by rotating drive mechanism 30 in one direction (e.g., clockwise). Similarly, specimen stage 16 may be moved in a downward direction by rotating drive mechanism 30 in the opposite direction (e.g., counterclockwise). It will be appreciated that, while drive mechanisms 30 may be embodied as a screen in the present figure, other drive mechanisms can be used. The relative movement of objective lens 18 and specimen S is important, such that drive mechanisms could alternatively or additionally manipulate the microscope to move it relative to the specimen S. Generally, drive mechanism 30 may be such that stage 16, and thus the specimen S thereon, can be moved in very small increments, on the order of microns or even more preferably nanometers because the magnitude of the depths of field being empirically determined through the present apparatus and method are typically very small. Motor 28 can be controlled by a computing system 32, communicating with the motor 28 through one or more connections 34 or other appropriate mechanism, such as wireless communication.

In some embodiments, focus detection system 14 may also include a motor 36 to open and close F-Stop 24. Similar to motor 28, motor 36 may also be controlled by computing system 32, communicating with motor 36 through one or more connections 34 or other appropriate mechanism, such as wireless communication.

In some embodiments, computing system 32 and image sensor 26 may communicate via one or more connections 40 or other appropriate mechanism, such as wireless communication. An operator input unit 42, such as a keyboard, touch screen monitor or other standard means may be available for allowing an operator to input desired controls and data.

As shown, computing system 32 may include an autofocus model 100. Autofocus model 100 may be configured to automatically adjust a position of specimen stage 16 with respect to objective lens 18 for purposes of focusing optical system 12. Autofocus model 100 may be representative of a regression convolutional neural network depicted in FIG. 1 (illustrating a prediction model based on the U-Net architecture, according to exemplary embodiments) to predict a signed distance to focus (e.g., positive of negative distance), based on an input of two images of the specimen. For example, autofocus model 100 may identify a difference to focus between the two images. This difference may automatically encode the direction to focus, because the upper image may be the less focused if above the focal plane and more focused if below the focal plane; thus, a signed difference.

Figure 2:
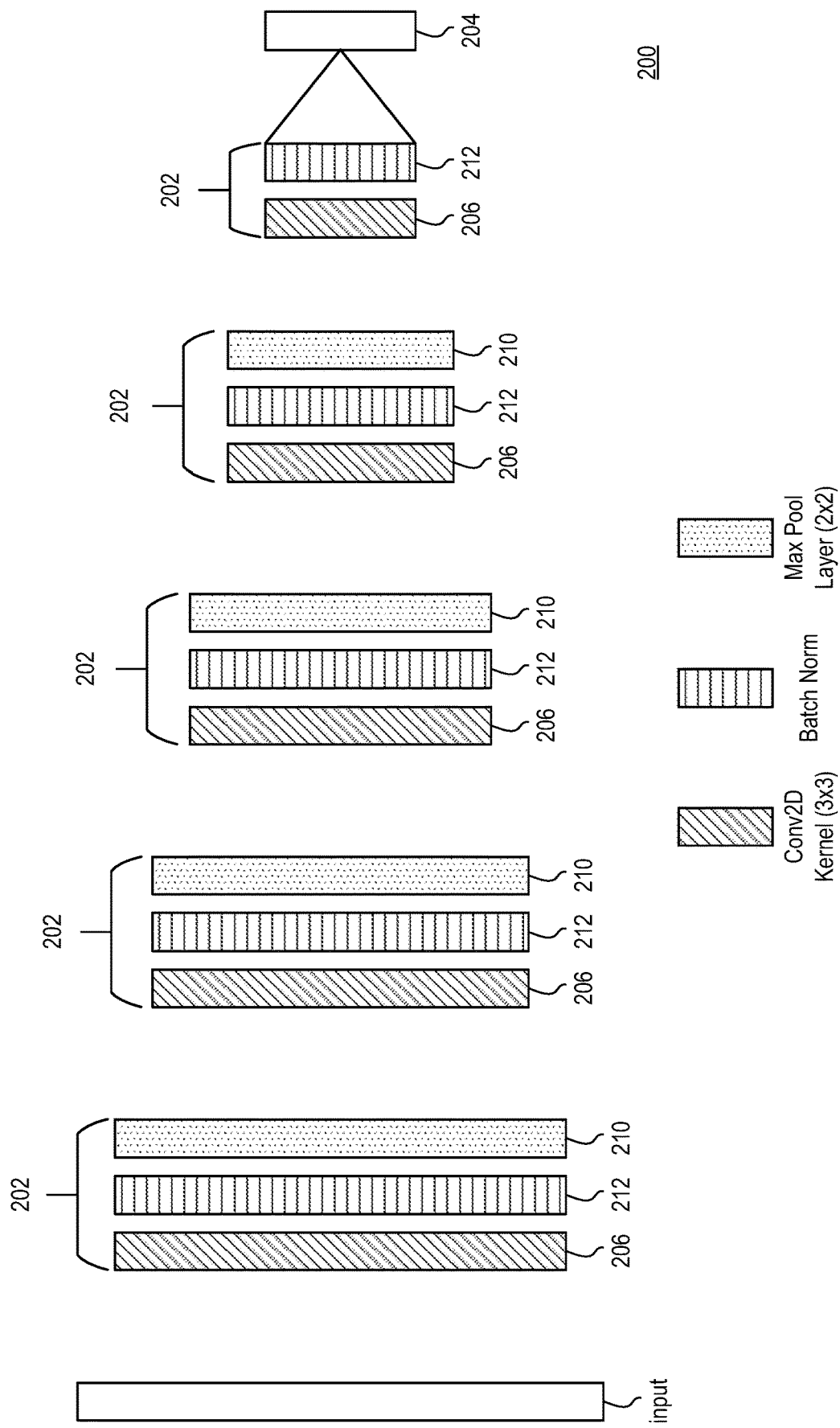
FIG. 2 illustrates an architecture of an autofocus model, according to example embodiments.

FIG. 2 is a block diagram illustrating an exemplary architecture 200 of autofocus model 100, according to example embodiments. Autofocus model may include five convolutional blocks 202 followed by a dense output layer 204. Each convolution block 202 may include a convolution layer 206 with 3×3 filters, a rectified linear activation function (ReLU) (not shown), and a max pooling layer 210 with a down-sampling factor of two. In some embodiments, a batch normalization layer 212 may be introduced after each max pooling layer 210.

In some embodiments, autofocus model 100 may double the number of feature maps in each successive convolutional block 202, starting with four and going up to sixty-four. Autofocus model 100 may further include an output dense layer 204. Output dense layer 204 may include a single node with a linear activation that is fully connected to the previous convolution layer. In some embodiments, a linear activation may be used to achieve positive and negative value for distance to focus. Architecture 200 may be selected in order to avoid overfitting, but its size makes it efficient to train.

During training, computing system 32 may use, as a loss function, a root mean square error (RMSE) which is defined as follows:

$$RMSE = \sqrt{\frac{1}{N}\sum_{i=1}^{N}(y_i - x_i)^2}$$

In some embodiments, computing system 32 may initialize the weights for autofocus model 100 using a He normal initializer. In some embodiments, computing system 32 may use an Adam optimizer during training. For example, computing system 32 may use an Adam optimizer with an initial learning rate of 0.0001 and a learning rate decaying by a power of 10 on plateau of the validation loss. However, those skilled in the art understand that other learning rates may be used. In some embodiments, computing system 32 may train autofocus model 100 for about 100 epochs with, for example, a batch size of about sixteen for training and about four for validation. During testing, computing system 32 may evaluate if an image is in focus by calculating the image's distance from an optimal focus position, as determined by a reference auto-focus algorithm, and checking if this distance falls within the depth of field (DoF) of objective lens 18. For example, for a 5X objective, the distance is about 12.2 µm. Computing system 32 may then calculate the percentage of images in-focus as follows:

$$\% \text{ in focus} = 100 * \sum_{i=1}^{N} I\,(\textit{offset}_i < DoF)$$

In some embodiments, the reference autofocus algorithm used to determine the focal plane may be Parabolic Search Focus with the Tenengrad scoring metric.

In some embodiments, the dataset may be generated with nSpec™, an automated inspection platform. In some embodiments, microscope system 10 may scan a bare specimen at about 5× magnification with F-stop 24 closed and a patterned specimen with F-stop 24 open. Microscope system 10 may scan a plurality of locations spread out across each specimen as shown. At each location, microscope 10 system may collect a Z-stack of images. For example, the Z-stack of images collected may be in the range of about +30 μm to about −30 μm around the focal plane at a about 1 μm interval making a total of about 600 images per location. In some embodiments, the determination of the increment z movement for the proximity of the two nearby images as well as the z movement associated with the training sets may be set according to experience or by association of the step size as function of the depth of focus (DOF). For example, if the DOF for a specific objective is 20 μm then the step size could be determined as a function of the DOF such as: 5% of the DOF and assigning the step to be 1 μm. As those skilled in the art recognize, other ranges, intervals, and images may be used. In some embodiments, the dimension of each image may be about 2200×2752. In some embodiments, each image may be downsampled in half to a about 1100×1376 single channel image. Sample input images are shown in FIG. 1. Each image may be paired with an image of about +1 μm above it to calculate the difference image that is the input to the neural network.

In some embodiments, the data at each location was split randomly into train, validation, and test sets. For example, the data may be split into train, validation, and test sets at a 400:100:100 ratio. In some embodiments, the model was trained with an initial learning rate of 0.0001 and it was decreased by a factor of 10 on plateau. In some embodiments, the batch size was set to 16 for the training set and 4 for the validation set.

In some embodiments, to establish the accuracy and speed of the prediction model, microscope system 10 may run a test on a plurality of test images across all data locations and at various distances from focus. In some embodiments, the system may measure the RMSE of distance to the focal plane and the percent images in focus (number of images within the DoF of the objective).

In some embodiments, to establish the accuracy and speed of the traditional focus algorithm for comparison, computing system 32 may calculate the focus at a plurality of random locations. In some embodiments, computing system 32 may run the current contrast-based autofocus algorithm Parabolic Search at +/−30 μm, +/−20 μm, +/−10 μm, and 0 μm from the manually determined truth focus and measure its error and time duration.

Computing system 32 is able to achieve an accuracy of about 95% in focus images with RMSE of about 6.23 μm. Compared to a conventional approach, parabolic autofocus, had an accuracy of 99% and a RMSE 5.89 μm. Even though the autofocus model 100 may have a lower in focus percentage, the RMSE was similar to that of the conventional method. However, the average focusing time of computing system 32 was about 0.79 s; in comparison, the average focusing time of the conventional method is 3 times slower at 2.3 s. Autofocus model 100 may takes may take about 0.009 s to make an autofocus prediction; the rest of the time may be occupied by moving the Z-axis and acquiring input images. Thus, computing system 32 is considerably faster than what is currently used in the field, and it can enable specimen inspection at greater throughput.

In some embodiments, such as those where it is difficult to predict an in-focus plane, computing system 32 can move specimen stage 16 to a position predicted by autofocus model 100, take an image, and evaluate the focus of optical system 12 using a contrast scoring metric.

In some embodiments, output from autofocus model 100 may serve as an estimate to the focal plane. Computing system 32 may use this estimate to identify the focal plane of the specimen using one or more fine-focus algorithms. In this manner, output from autofocus model 100 may serve as a starting position for computing system 32 to identify the focal plane instead of an actual distance to the focal plane.

In some embodiments, output from autofocus model 100 may be a range of distances that is likely close to or contains the true distance to the focal plane. Using the range of distances, computing system 32 may implement one or more fine-focus algorithms in the range of distances to identify the actual distance to the focal plane. Such approach may be useful, for example, because it may provide computing system 32 with a more precise estimate of the focal distance. In this manner, computing system 32 may utilize autofocus model 100 to evaluate the focal plane at a certain position of the specimen instead of providing an actual numerical value of the distance to the focal plane.

Figure 3:
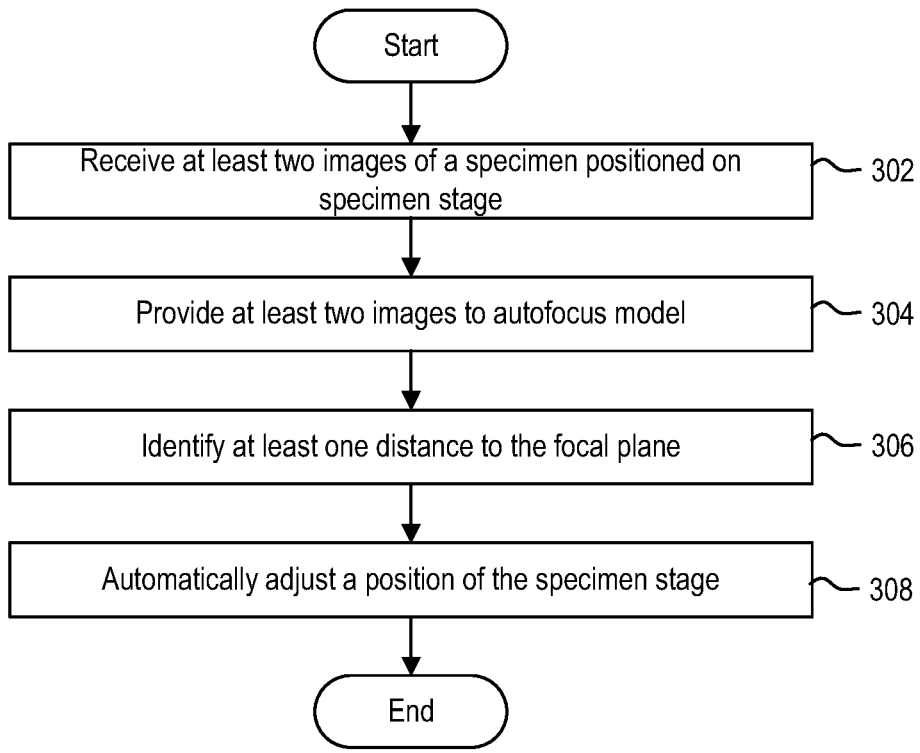
FIG. 3 is a flow diagram illustrating a method of automatically focusing a microscope system, according to example embodiments.

FIG. 3 is a flow diagram illustrating a method 300 of automatically focusing an optical system 12 of a microscope system 10, according to example embodiments. Method 300 may begin at step 302.

At step 302, computing system 32 may receive at least two images of a specimen positioned on specimen stage 16 of microscope system 10. In some embodiments, the at least two images may be taken at a fixed distance apart in the z-direction. In some embodiments, the at least two images may include a first image taken above a focal plane of the specimen and a second image taken below the focal plane of the specimen. In some embodiments, the at least two images may be taken above the focal plane of the specimen. In some embodiments, the at least two images may both be taken below the focal plane of the specimen. In some embodiments, for each image of the at least two images, the position of specimen stage 16 or specimen on specimen stage 16 may be constant. In some embodiments, for each image of the at least two images, the position of specimen stage 16 or specimen on specimen stage 16 may be varied.

In some embodiments, there may be multiple focal planes for a give objective lens 18 and specimen. In this manner, computing system 32 may receive multiple sets of two or more images based on the multiple focal planes.

At step 304, computing system 32 may provide the at least two images to autofocus model 100. Autofocus model 100 may be representative of a regression-based convolutional neural network configured to identify a distance to the focal plane of the specimen. In some embodiments, the distance to the focal plane of the specimen may be a signed difference. For example, the distance may indicate whether specimen stage 16 needs to be moved in a positive or negative direction.

At step 306, computing system 32 may identify a distance to the focal plane of the specimen. For example, autofocus model 100 may analyze the at least two images to identify the focal plane of the specimen and a signed difference to the focal plane. The signed distance to the focal plane may indicate a distance specimen stage 16 may travel for objective lens 18 to be in focus. In some embodiments, rather than identifying a single distance to the focal plane, computing system 32 may identify a range of distances to the focal plane. For example, autofocus model 100 may analyze the at least two images to identify the focal plane of the specimen and a range of signed distances to the focal plane.

At step 308, computing system 32 may automatically adjust a position of specimen stage 16. For example, based on the identified distance to the focal plane, computing system 32 may cause motor 28 and/or drive mechanism 30 to adjust the distance between specimen stage 16 and objective lens 18. In some embodiments, computing system 32 may adjust specimen stage 16 in a positive direction. In some embodiments, computing system 32 may adjust specimen stage 16 in a negative direction.

FIG. 4A illustrates an architecture of system bus computing system 400, according to example embodiments. One or more components of system 400 may be in electrical communication with each other using a bus 405. System 400 may include a processor (e.g., one or more CPUs, GPUs or other types of processors) 410 and a system bus 405 that couples various system components including the system memory 415, such as read only memory (ROM) 420 and random access memory (RAM) 425, to processor 410. System 400 can include a cache of high-speed memory connected directly with, in close proximity to, or integrated as part of, processor 410. System 400 can copy data from memory 415 and/or storage device 430 to cache 412 for quick access by processor 410. In this way, cache 412 may provide a performance boost that avoids processor 410 delays while waiting for data. These and other modules can control or be configured to control processor 410 to perform various actions. Other system memory 415 may be available for use as well. Memory 415 may include multiple different types of memory with different performance characteristics. Processor 410 may be representative of a single processor or multiple processors. Processor 410 can include one or more of a general purpose processor or a hardware module or software module, such as service 1 432, service 2 434, and service 4 436 stored in storage device 430, configured to control processor 410, as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the system 400, an input device 445 can be any number of input mechanisms, such as a microphone for speech, a touch-sensitive screen for gesture or graphical input, keyboard, mouse, motion input, speech and so forth. An output device 435 (e.g., a display) can also be one or more of a number of output mechanisms known to those of skill in the art. In some instances, multimodal systems can enable a user to provide multiple types of input to communicate with system 400. Communication interface 440 can generally govern and manage the user input and system output. There is no restriction on operating on any particular hardware arrangement, and therefore the basic features here may easily be substituted for improved hardware or firmware arrangements as they are developed.

Storage device 430 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 can include services 432, 434, and 436 for controlling the processor 410. Other hardware or software modules are contemplated. Storage device 430 can be connected to system bus 405. In one aspect, a hardware module that performs a particular function can include the software component stored in a computer-readable medium in connection with the necessary hardware components, such as processor 410, bus 405, output device 435 (e.g., a display), and so forth, to carry out the function.

FIG. 4B illustrates a computer system 450 having a chipset architecture, according to example embodiments. Computer system 450 may be an example of computer hardware, software, and firmware that can be used to implement the disclosed technology. System 450 can include one or more processors 455, representative of any number of physically and/or logically distinct resources capable of executing software, firmware, and hardware configured to perform identified computations. One or more processors 455 can communicate with a chipset 460 that can control input to and output from one or more processors 455. In this example, chipset 460 outputs information to output 465, such as a display, and can read and write information to storage device 470, which can include magnetic media, and solid-state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 455 analyzing data stored in storage device 470 or 475. Further, the machine can receive inputs from a user through user interface components 485 and execute appropriate functions, such as browsing functions by interpreting these inputs using one or more processors 455.

It can be appreciated that example systems 400 and 450 can have more than one processor 410, 455 or be part of a group or cluster of computing devices networked together to provide greater processing capability.

As provided above, conventional microscopy autofocus methods perform a time-consuming sweep through the focal axis while running a focus scoring algorithm on each image to determine the focal plane. This procedure can impede the fast throughput production schedules in-specimen inspection. Also, it increases the amount of photobleaching of light sensitive samples. To circumvent these obstacles, the present system may implement a deep learning model to predict—in one shot—the exact distance to focus for a microscope system given an input of only two images take at an arbitrary initial position. The autofocus model may learn the mapping between defocused images and the absolute distance from the focal plane. The autofocus model may provide for focusing three times faster than the traditional approach and is 95% accurate at producing in-focus images. It can be augmented with a traditional fine-focus approach to eliminate any error. Notably, because of its speed the present method can be utilized in rapid specimen inspection and imaging of photo-sensitive specimen samples.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A microscope system comprising:
an optical system for imaging a specimen, the optical system comprising an objective lens and a specimen stage configured to support the specimen during imaging; and
a focus detection system for automatically focusing the optical system, the focus detection system comprising a computing system that includes a processor and a memory, the memory has programming code stored thereon, which, when executed by the processor, causes the computing system to perform operations, comprising:
receiving, by the computing system from the optical system, only two images of the specimen positioned on the specimen stage, wherein the two images comprise a first image taken above or below a focal plane of the specimen and a second image taken above or below the focal plane;
providing, by the computing system, the two images, as input, to a convolutional neural network to detect at least one distance to the focal plane of the specimen;
identifying, via the convolutional neural network, the at least one distance to the focal plane of the specimen by analyzing both the first image and the second image; and
based on the identifying, automatically adjusting, by the computing system, a position of the specimen stage with respect to the objective lens of the microscope system.

2. The microscope system of claim 1, wherein receiving, by the computing system from the optical system, the two images of the specimen positioned on the specimen stage of the microscope system comprises:
receiving the first image at a first z-position; and
receiving the second image of the two images at a second z-position.

3. The microscope system of claim 2, wherein an x-position and a y-position of the specimen stage remains constant while the first z-position differs from the second z-position.

4. The microscope system of claim 1, wherein identifying, via the convolutional neural network, the at least one distance to the focal plane of the specimen comprises:
generating a range of distances to the focal plane, wherein the range of distances comprises an actual distance to the focal plane.

5. The microscope system of claim 1, wherein the focal plane is one of multiple focal planes.

6. The microscope system of claim 5, wherein identifying, via the convolutional neural network, the at least one distance to the focal plane of the specimen comprises:
identifying at least one first distance to a first focal plane of the multiple focal planes of the specimen; and
identifying at least one second distance to a second focal plane of the multiple focal planes of the specimen.

7. The microscope system of claim 1, wherein automatically adjusting, by the computing system, the position of the specimen stage with respect to the objective lens of the microscope system comprises:
causing a drive mechanism of the microscope system to adjust the distance between the specimen stage and the objective lens.

8. A method comprising:
receiving, by a computing system from an image sensor, only two images of a specimen positioned on a specimen stage of a microscope system, wherein the two images comprise a first image taken above or below a focal plane of the specimen and a second image taken above or below the focal plane;
providing, by the computing system, the two images, as input, to a convolutional neural network to detect at least one distance to the focal plane of the specimen;
identifying, via the convolutional neural network, the at least one distance to the focal plane of the specimen by analyzing both the first image and the second image; and
based on the identifying, automatically adjusting, by the computing system, a position of the specimen stage with respect to an objective lens of the microscope system.

9. The method of claim 8, wherein receiving, by the computing system from the image sensor, the two images of the specimen positioned on the specimen stage of the microscope system comprises:
receiving the first image of the two images at a first z-position; and
receiving the second image of the two images at a second z-position.

10. The method of claim 9, wherein an x-position and a y-position of the specimen stage remains constant while the first z-position differs from the second z-position.

11. The method of claim 8, wherein identifying, via the convolutional neural network, the at least one distance to the focal plane of the specimen comprises:
generating a range of distances to the focal plane, wherein the range of distances comprises an actual distance to the focal plane.

12. The method of claim 8, wherein the focal plane is one of multiple focal planes.

13. The method of claim 12, wherein identifying, via the convolutional neural network, the at least one distance to the focal plane of the specimen comprises:
identifying at least one first distance to a first focal plane of the multiple focal planes of the specimen; and
identifying at least one second distance to a second focal plane of the multiple focal planes of the specimen.

14. The method of claim 8, wherein automatically adjusting, by the computing system, the position of the specimen stage with respect to the objective lens of the microscope system comprises:
causing a drive mechanism of the microscope system to adjust the distance between the specimen stage and the objective lens.

15. A non-transitory computer readable medium comprising one or more sequences of instructions, which, when executed by a processor, causes a computing system to perform operations comprising:
receiving, by the computing system from an image sensor, only two images of a specimen positioned on a specimen stage of a microscope system, wherein the two images comprise a first image taken above or below a focal plane of the specimen and a second image taken above or below the focal plane;
providing, by the computing system, the two images, as input, to a convolutional neural network for detecting at least one distance to the focal plane of the specimen;
identifying, via the convolutional neural network, the at least one distance to the focal plane of the specimen by analyzing both the first image and the second image; and
based on the identifying, automatically adjusting, by the computing system, a position of the specimen stage with respect to an objective lens of the microscope system.

16. The non-transitory computer readable medium of claim 15, wherein receiving, by the computing system from the image sensor, the two images of the specimen positioned on the specimen stage of the microscope system comprises:
receiving the first image of the two images at a first z-position; and
receiving the second image of the two images at a second z-position.

17. The non-transitory computer readable medium of claim 15, wherein identifying, via the convolutional neural network, the at least one distance to the focal plane of the specimen comprises:
generating a range of distances to the focal plane, wherein the range of distances comprises an actual distance to the focal plane.

18. The non-transitory computer readable medium of claim 15, wherein the focal plane is one of multiple focal planes.

19. The non-transitory computer readable medium of claim 18, wherein identifying, via the convolutional neural network, the at least one distance to the focal plane of the specimen comprises:
identifying at least one first distance to a first focal plane of the multiple focal planes of the specimen; and
identifying at least one second distance to second focal plane of the multiple focal planes of the specimen.

20. The non-transitory computer readable medium of claim 15, wherein automatically adjusting, by the computing system, the position of the specimen stage with respect to the objective lens of the microscope system comprises:
causing a drive mechanism of the microscope system to adjust the distance between the specimen stage and the objective lens.

* * * * *